United States Patent
Poezart et al.

(10) Patent No.: US 11,162,818 B2
(45) Date of Patent: Nov. 2, 2021

(54) SENSOR DEVICE, SYSTEM AND RELATED METHOD

(71) Applicant: Melexis Technologies SA, Bevaix (CH)

(72) Inventors: Mathieu Poezart, Saint-Aubin-Sauges (CH); Zsombor Lazar, Murten (CH); Antonius Duisters, Tafers (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 121 days.

(21) Appl. No.: 16/585,187

(22) Filed: Sep. 27, 2019

(65) Prior Publication Data
US 2020/0103254 A1    Apr. 2, 2020

(30) Foreign Application Priority Data

Sep. 27, 2018 (EP) ..................... 18197393

(51) Int. Cl.
*G01D 5/244* (2006.01)
*G01D 3/036* (2006.01)

(52) U.S. Cl.
CPC ..... *G01D 5/24409* (2013.01); *G01D 5/24476* (2013.01); *G01D 3/036* (2013.01)

(58) Field of Classification Search
CPC ........... G01D 5/24409; G01D 5/24476; G01D 3/036; H04L 67/12; G01R 33/02; G01R 33/022; G01R 33/07; G01R 33/077
See application file for complete search history.

(56) References Cited

U.S. PATENT DOCUMENTS

| | | | | |
|---|---|---|---|---|
| 9,837,990 | B1* | 12/2017 | Pagnanelli | H03M 3/322 |
| 2008/0265824 | A1* | 10/2008 | Yim | G05B 19/404 |
| | | | | 318/632 |
| 2010/0094495 | A1* | 4/2010 | Fujimoto | B60L 15/2036 |
| | | | | 701/22 |
| 2010/0157080 | A1* | 6/2010 | Kondo | H04N 5/91 |
| | | | | 348/222.1 |

(Continued)

FOREIGN PATENT DOCUMENTS

EP    3517897 A1    7/2019

OTHER PUBLICATIONS

European Search Report from EP Application No. 18197393.4, dated Feb. 14, 2019.

*Primary Examiner* — Huy Q Phan
*Assistant Examiner* — Zannatul Ferdous
(74) *Attorney, Agent, or Firm* — Workman Nydegger

(57) ABSTRACT

A sensor device comprises a sensor unit for generating a signal indicative of a physical quantity. The device comprises a processing unit for receiving the signal, in which the processing unit comprises a storage memory for storing data derived from the signal as provided by the sensor unit at at least two points in time. The device comprises a bus interface for communicating with an electronic control unit via a digital communication bus. When a read command is received from the electronic control unit, an estimate of the physical quantity is sent in response to the electronic control unit. The processing unit comprises an estimator for calculating the estimate at a reference point in time based on the data stored in the storage memory, in which the reference point in time differs from the point in time at which the read command is received by substantially a predetermined offset.

19 Claims, 5 Drawing Sheets

(56) References Cited

U.S. PATENT DOCUMENTS

| | | | |
|---|---|---|---|
| 2013/0339564 A1* | 12/2013 | Nogueira | G06F 13/36 |
| | | | 710/305 |
| 2015/0213706 A1* | 7/2015 | Bai | G05B 23/0221 |
| | | | 340/635 |
| 2016/0334437 A1 | 11/2016 | Nishida et al. | |
| 2017/0082463 A1* | 3/2017 | Noguchi | G01D 5/26 |
| 2017/0163366 A1* | 6/2017 | Aichriedler | H04J 3/0658 |
| 2018/0164125 A1* | 6/2018 | Dakshinamurthy | |
| | | | G01C 19/5776 |

* cited by examiner

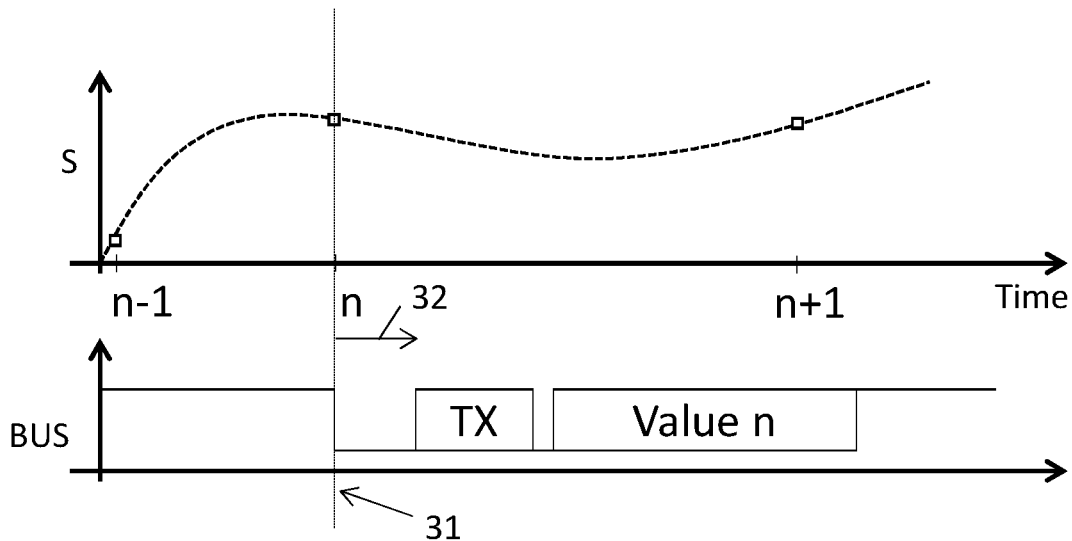
FIG 1 – PRIOR ART
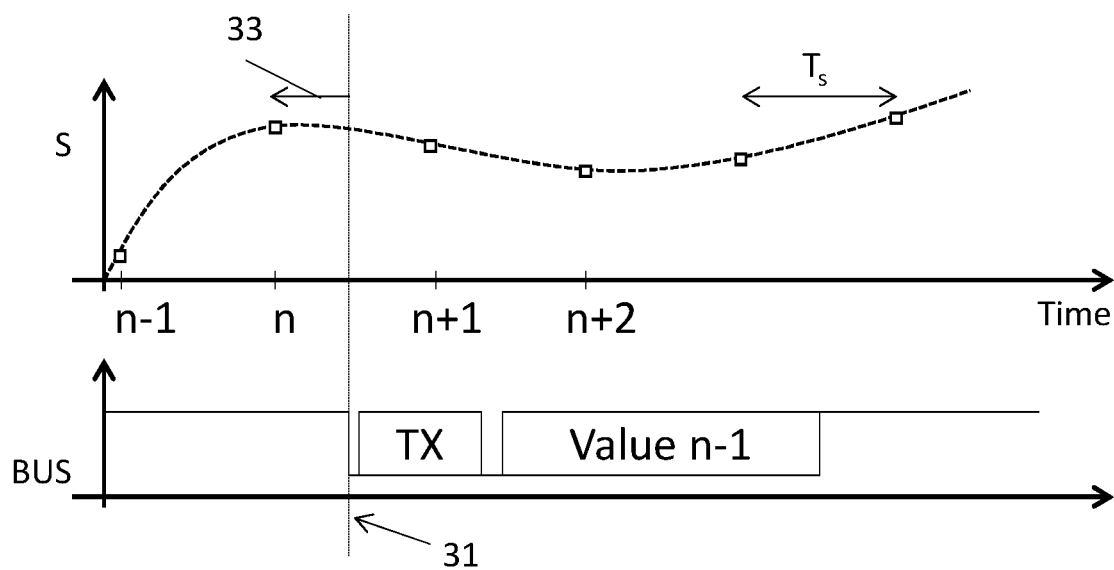
FIG 2 – PRIOR ART

SENSOR DEVICE, SYSTEM AND RELATED METHOD

FIELD OF THE INVENTION

The invention relates to the field of sensor devices for reporting sensor data via a bus communication system. More specifically it relates to a sensor device, a system comprising such sensor devices and a method for communicating sensor data via a bus system.

BACKGROUND OF THE INVENTION

In various applications, such as in automotive system architectures, a trend exist for an increasing requirement for complexity and environment adaptability in sensor systems. For example, the number of sensors for monitoring vehicle variables and/or for sensing environmental attributes keeps increasing in modern cars. The sensor data thus acquired may be crucial for decision taking in most of the main vehicle functionalities. Integrating a large number of sensors in a coordinated system, such as a vehicle, also poses increasing demands on sensor data communication bus systems.

However, while system and communication bus complexity may be increasing, integration of the acquired sensor information in critical decision processes, such as deployment of safety measures (e.g. airbags, ABS, obstacle detection and the like) and/or essential drive processes (e.g. pedal, electric motor torque information, etc.); may require exceptionally low sensor latencies and/or high predictability of latencies.

US 2017/0163366 discloses an approach that enables robust, high-speed communication of sensor data. An electronic control unit (ECU) outputs a synchronization signal to a sensor bus. One or more sensors connected to the bus then samples sensor data in response to the synchronization signal and transmit the sampled sensor data to the sensor bus.

FIG. 1 illustrates this approach. When the sensor device receives the trigger signal 31 sent by the ECU, the sensor signal S is sampled, cf. sample n. However, this implies a latency 32 with respect to the trigger signal, due to the required time to read out the sensor, to sample the signal and to prepare the sampled signal for transmitting in the form of a to be reported value via the bus.

In other prior art approaches, as illustrated in FIG. 2, the sensor readout is continuously sampled at a sampling frequency $f_s$ (corresponding to a sampling period $T_s$). When a trigger signal 31 is received from the ECU, the last sampled value, cf. sample n−1, is reported. However, this implies a variable delay uncertainty 33. While a variable uncertainty may not be a problem for all applications, it is problematic for certain applications where substantially simultaneous readout of multiple sensors is required.

SUMMARY OF THE INVENTION

It is an object of embodiments of the present invention to provide efficient and/or good means and/or methods to ensure a substantially constant (e.g. within negligible tolerance limits) and predetermined latency between a request for data from an electronic control unit in a bus sensor system.

It is an advantage of embodiments of the present invention that a controlled latency, e.g. a substantially constant data age, can be achieved in a bus-connected sensor device.

It is an advantage of embodiments of the present invention that a latency can be controlled as a sum of a predetermined offset and a protocol latency for transmitting data from a sensor to an electronic control unit. Both the predetermined offset and the protocol latency may be substantially (e.g. up to negligible variations, e.g. of the order of 10 µs, or 5 µs, or 2 µs, or 1 µs and less) constant and repeatable.

It is an object of embodiments of the present invention to provide a sensor system comprising a master device and a plurality of sensor devices connected to a digital bus, which sensor devices are capable of providing a value indicative of a respective physical quantity to be measured, at substantially the same moment in time.

It is an object of embodiments of the present invention to provide a sensor system comprising a master device (e.g. an ECU) and a plurality of sensor devices connected to a digital bus (e.g. a CAN-bus or CAN-FD bus in an automotive environment), configured for obtaining sensor data from the plurality of sensor devices with a reduced jitter between the measurement data provided by each sensor device, (e.g. in the order of 1 µs and less), without synchronizing the clocks of the plurality of sensor devices at which samples are taken.

The above objectives are accomplished by a method, a device and a system according to embodiments of the present invention.

In a first aspect, the present invention relates to a sensor device comprising a sensor unit for generating a signal indicative of a physical quantity and a processing unit for receiving the signal. The processing unit comprises a storage memory for storing data derived from the signal as provided by the sensor unit at at least two points in time, i.e. derived from signal values that were acquired at at least two different points in time. The sensor device comprises a bus interface for communicating with an electronic control unit via a digital communication bus. The bus interface is adapted for receiving a read command from the electronic control unit at a point in time, uncorrelated with the at least two different points in time, and for sending, in response to the read command, an estimate of the physical quantity to the electronic control unit. The processing unit further comprises an estimator for calculating the estimate of the physical quantity at a reference point in time based on the data stored in the storage memory. The reference point in time differs from the point in time at which the read command is received by substantially a predetermined offset, which may be positive, negative or substantially zero (e.g. negligible).

In an embodiment, the sensor device is a sensor device for use in an automotive environment, e.g. for motor control.

In an embodiment, the digital communication bus is a CAN-bus.

In an embodiment, the digital communication bus is a CAN-FD-bus.

In an embodiment, the read command is a periodic signal.

In an embodiment, the read command is an aperiodic signal (i.e. does not repeat at constant time intervals).

In an embodiment, the digital communication bus is a bidirectional communication bus.

In an embodiment, the sensor unit is a magnetic sensor unit, and the physical quantity to be measured is a magnetic field value, or a value derived therefrom (e.g. a magnetic field gradient).

In a sensor device in accordance with embodiments of the present invention, the read command may be a broadcast read command which simultaneously targets a plurality of sensor devices connected to the bus.

In a sensor device in accordance with embodiments of the present invention, the estimator may be adapted for calculating the estimate upon receiving a request from the bus interface when the read command has been received.

In an embodiment, the bus interface is adapted for providing a request signal to the estimator when said read command is received, and said estimator is adapted for calculating said estimate upon receipt of said request signal.

In a sensor device in accordance with embodiments of the present invention, the estimator may be adapted for repeatedly updating the estimate and making the updated estimate available to the bus interface for use when receiving the read command.

In a sensor device in accordance with embodiments of the present invention, the storage memory may be adapted for storing at least a last sample and a next to last sample of the signal, and the estimator may be adapted for calculating the estimate by an interpolation and/or extrapolation of the data stored in the storage memory to the reference point in time.

In a sensor device in accordance with embodiments of the present invention, the estimator may be adapted for calculating the estimate by an estimation method based on a linear interpolation, a quadratic interpolation, a higher-order interpolation, a moving average and/or an exponential moving average.

In an embodiment, the interpolator is constantly interpolating at an interpolation frequency. The interpolation frequency is preferably an integer multiple of the sampling frequency and is at least 2.0 or at least 5.0 or at least 10 times higher than the average read command frequency and is asynchronous to the read-command.

In an embodiment, the interpolator contains a memory or a FIFO, and is adapted for output one the interpolated value already present in the memory or FIFO, which is closest in time to the time-of-arrival of the read-command minus the predefined offset, or the interpolated value directly before, or the interpolated value directly after.

In a sensor device in accordance with embodiments of the present invention, the processing unit may comprise a phase-tracking loop unit and/or a phase locked loop unit for tracking the physical quantity. The storage memory may be adapted for storing at least one parameter of the phase-tracking loop unit and/or of the phase locked loop unit. The estimator may be adapted for calculating the estimate based on an output of the phase-tracking loop unit and/or the phase locked loop unit.

In a sensor device in accordance with embodiments of the present invention, the processing unit may comprise a sigma-delta modulator.

In a sensor device in accordance with embodiments of the present invention, the sensor device may be an angular position sensor device, and the sensor unit may comprise a plurality of sensor elements arranged to produce a plurality of signals each being a function of an input quantity, such as an input phase representative of a position to be measured.

In a sensor device in accordance with embodiments of the present invention, the phase-tracking loop unit may be adapted for generating an error signal by combining the plurality of signals according to an array of weight factors stored in the storage memory, for filtering the error signal to generate an output quantity, e.g. a phase value representative of the position to be measured, as the output of the phase-tracking loop unit and for adjusting the array of weight factors based on said output quantity.

In a sensor device in accordance with embodiments of the present invention, the sensor unit may comprise a plurality of sensor elements arranged to produce a plurality of signals each being a function of an input quantity, e.g. a phase representative of a position to be measured. The estimator may implement a phase-tracking loop and/or a phase-locked loop for tracking the physical quantity and is adapted for generating an error signal by combining the plurality of signals with an array of weight factors.

In a sensor device in accordance with embodiments of the present invention, the sensor unit may be adapted for sampling the physical quantity or another physical quantity that is indicative of the physical quantity at a predetermined sampling frequency fs.

In an embodiment, the sampling frequency ($f_s$) and the read command are asynchronous.

In an embodiment, the sampling frequency ($f_s$) and the read command are uncorrelated signals, in the meaning that the read command may arrive at any moment in time, and that the sensor device takes samples at regular intervals irrespective of the read command.

In an embodiment, the predetermined sampling frequency (fs) has a substantially fixed frequency within a tolerance of +/−1% and is not changed by the timing of the read command.

In an embodiment, the read command defines a first period (e.g. if the read command is periodic) or a first average period (e.g. the average time between two read commands, in case the read command is aperiodic), and this first period or first average period is larger than the sampling period, the sampling period Ts being the inverse of the sampling frequency Ts=1/fs, or larger than at least 2 times the sampling period, or at least 5 times, or at least 10 times, or at least 20 times, or at least 50 times, or at least 100 times. This can be written mathematically as fr≤k*fs, where fr is the frequency or average frequency of the read command, fs is the sampling frequency of the sensor device, and k is a number larger than 1.0, or larger than 2.0 or larger than 2.2, or larger than 2.5, or larger than 3.0, or larger than 4.0, or larger than 5.0.

In an embodiment, the read command has a first frequency or a first average frequency smaller than 50 kHz, and the sampling rate of the sensor device is at least 200 kHz.

In an embodiment, the read command has a first frequency or a first average frequency in the range from 10 Hz to 1000 Hz, and the sampling frequency in the sensor is a predefined frequency at least a factor 2, or at least a factor 5, or at least a factor 10, or at least a factor 20 times higher, or at least a factor 50 times higher, or at least a factor 100 times higher. The ratio of the sampling frequency and the frequency (or average frequency) of the read command) may be a value in the range from 2 to 1000, or in the range from 5 to 1000, or in the range from 10 to 1000, or in the range from 2 to 100, or in the range from 5 to 100, or in the range from 10 to 100.

In an embodiment, the read command has a first frequency or a first average frequency in the range from 500 Hz to 50 kHz, and the sampling frequency in the sensor is a predefined frequency at least a factor 2, or at least a factor 5, or at least a factor 10, or at least a factor 20 times higher, or at least a factor 50 times higher, or at least a factor 100 times higher. The ratio of the sampling frequency and the frequency (or average frequency) of the read command) may be a value in the range from 2 to 1000, or in the range from 5 to 1000, or in the range from 10 to 1000, or in the range from 2 to 100, or in the range from 5 to 100, or in the range from 10 to 100.

In an embodiment, the sampling frequency is at least 100 kHz, or at least 200 kHz, or at least 500 kHz, or at least 1 MHz; and in case the sensor device contains an interpolator, the interpolator frequency is at least a factor 2 or 5 or 10 times higher than the sampling frequency.

In a sensor device in accordance with embodiments of the present invention, the sensor unit may be adapted for providing a plurality of signals indicative of the same physical quantity, such as an angular position, e.g. an angular position of a rotor relative to a stator.

In a second aspect, the present invention relates to a system comprising a sensor bus, a plurality of sensor devices in accordance with embodiments of the first aspect of the present invention connected to said sensor bus and an electronic control unit connected to said sensor bus and configured to generate a broadcast read command that simultaneously targets said plurality of sensor devices.

In an embodiment, the system is a communication system in an automotive environment.

In an embodiment, the system is a communication system in an automotive environment, comprising a plurality of magnetic field sensors and/or a plurality of current sensors, and/or a plurality of voltage sensors.

In an embodiment, the system is used in a motor control system, for example for measuring the torque of an engine.

In a third aspect, the present invention relates to method for communicating sensor data via a digital communication bus. The method comprises, in each of a plurality of sensor devices connected to the bus, generating a signal indicative of a physical quantity and storing data derived from the signal as obtained at at least two different points in time. The method comprises sending a broadcast read command from an electronic control unit to a plurality of sensor devices via said bus. The method comprises, in each of the plurality of sensor devices connected to the bus, receiving the broadcast read command at a point in time uncorrelated with the at least two points in time and sending, in response to the read command, an estimate of the physical quantity to the electronic control unit. The estimate is calculated at a reference point in time based on the stored data. The reference point in time differs from the point in time at which the read command is received by substantially a predetermined offset, which may be positive, negative or substantially zero (e.g. negligible).

In a method in accordance with embodiments of the present invention, calculating the estimate may comprise executing a phase-tracking loop for tracking the physical quantity and calculating the estimate based on an output of the phase-tracking loop.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 1 shows a prior art approach for reporting a sensor value in response to a trigger signal sent by an electronic control unit via a bus.

FIG. 2 shows another prior art approach for reporting a sensor value in response to a trigger signal sent by an electronic control unit via a bus.

Figure 3:
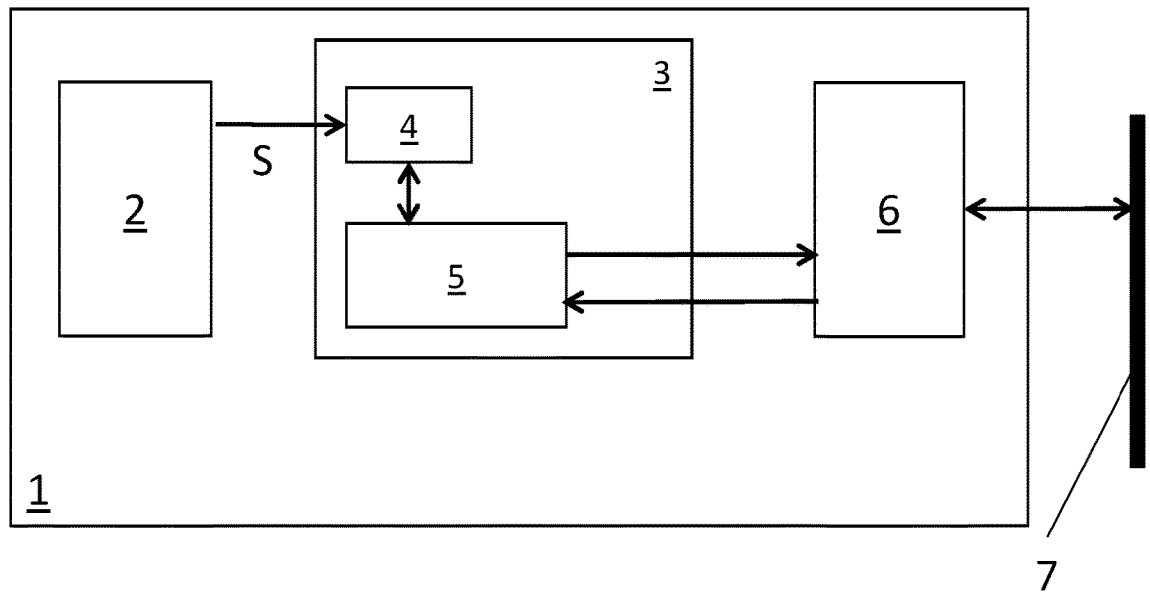
FIG. 3 illustrates a device in accordance with embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, the expression "average frequency of a (periodic or aperiodic) signal" refers to the inverse of the average "period" of that signal, measured over a predefined number of periods, for example measured over 50 consecutive periods, where the term "period" refers to the time period between two similar events of that signal (e.g. between two falling edges, or between two rising edges, or between the start points of two read commands, etc.). Such time period is constant for a periodic signal, but not constant for an aperiodic signal.

A problem underlying the present invention is that, unless special measures are taken, measurements made by different sensors (which are not synchronized) are typically not made at (exactly) the same moment in time, hence there is some variability due to time spread.

The inventors wanted to provide (inter alia) a sensor system comprising a master device and a plurality of sensor devices connected to a digital bus, which sensor devices are capable of providing a value indicative of a respective physical quantity to be measured, at substantially the same moment in time, without actually synchronizing the sensor devices.

In contrast to FIG. 1 where a measurement is taken after the read-command is received, and in contrast to FIG. 2 where measurements are periodically made and the most recent sample is output upon request, the inventors of the present invention surprisingly came to the insight that for some applications, it is less important to have a zero latency (e.g. smaller than 1.0 µs), but more importantly, to reduce jitter on a substantially constant delay, even if this substantially constant delay would be larger than for example 1.0 µs, or larger than 1.5 µs, or even larger than 2.0 µs, or even larger than 3.0 µs). More specifically, the inventors came to the idea of providing sensor devices that repeatedly sample a signal, and store the sampled data in a local memory, and upon request (e.g. when a read-command arrives), provide a suitable value derived from the stored data samples as an estimate of the signal at a specific moment in time, namely the moment at which the read command arrives minus a predefined substantially constant time period. In this way, all sensors provide data with a substantially constant non-zero latency, but with a reduced jitter. In fact, the amount of jitter is not primarily determined by the sampling frequency, but rather by characteristics of the estimator. This is one of the underlying ideas of the present invention. Several types of estimator are envisioned, inter alia an interpolator, an extrapolator, and a phase-tracking loop, but other estimators may also be used.

In a first aspect, the present invention relates to a sensor device comprising a sensor unit for generating a signal indicative of a physical quantity (e.g. a magnetic field component) and a processing unit for receiving the signal. The processing unit comprises a storage memory for storing data derived from the signal as provided by the sensor unit at at least two points in time, e.g. derived from the signal values corresponding to at least two distinct points in time in the past. The sensor device comprises a bus interface for communicating with an electronic control unit (ECU) via a digital communication bus, more in particular a bidirectional communication bus, e.g. a CAN-bus. The bus interface is adapted for receiving a read command from the ECU at a point in time that is uncorrelated with the at least two different points in time. In other words, the signal acquisition is not synchronized with the read command timing. The bus interface is adapted for sending, in response to the read command, an estimate of the physical quantity to the electronic control unit. The processing unit further comprises an estimator for calculating the estimate of the physical quantity at a reference point in time, e.g. which may typically be different from any of the at least two points in time, based on the data (already) stored in the storage memory. The reference point in time differs from the point in time at which the read command is received by substantially a predetermined offset. This offset may be positive, negative or even zero. For example, the predetermined offset may be in the range of zero to 25 µs, e.g. in the range of 1 µs to 10 µs, e.g. in the range of 3 µs to 8 µs, e.g. equal to about 5 µs. "Substantially a predetermined offset" means that some trivial and negligible jittering may be affect the predetermined offset, for example, such that the predetermined offset may vary within a small tolerance limit, preferably a tolerance in the range of 0 µs to 2 µs, e.g. +/−2 µs or +/−1 µs.

The physical quantity may be an electrical quantity, e.g. a current and/or a voltage, a resistance, an impedance, and/or a field property, such as an electrical field component, magnitude and/or direction and/or magnetic field component, magnitude and/or direction.

For some applications, for example for motor control, it is of major importance that for example three measurements taken by three sensors, for example each configured for measuring one magnetic field component (in a particular direction), are taken at substantially the same time with minimal tolerance (e.g. +/−2 µs or +/−1 µs). This is possible for example with the system of FIG. 1, where each sensor device takes a sample in response to a read signal, i.e. after the receipt of the read signal.

FIG. 2 shows another prior art solution, where for example three sensors are synchronized (e.g. to an external clock), and each periodically take a sample based on that clock, and provide the last sample taken in response to a read signal. In order to calculate a consistent angular position, the three magnetic field values need to be taken at substantially the same moment, with minimum jitter between the measurements (e.g. at most +/−5 μs, or at most +/−2 μs, or at most +/−1 μs). If these values are read-out only after some delay (or latency, e.g. after 10 μs) is less important for certain applications, such as like for example a motor control loop. The inventors came to the idea of reducing the jitter between measurements taken by a plurality of sensors, by not synchronizing their internal clocks (as in FIG. 2) or by taking the actual measurement upon request (as in FIG. 1), but by sampling at a relatively high frequency, storing these values in a memory, and upon receipt of a read command, provide a value which is representative of the signal to be measured a predefined time before the arrival of the read command, for example by interpolation or extrapolation of the values stored in said memory. If all sensor devices connected to the digital bus perform this operation, the values provided will show minimal jitter. This is one of the underlying ideas of the present invention.

FIG. 3 shows a block diagram of an exemplary sensor device 1 in accordance with embodiments of the present invention. The sensor device may be an integrated circuit device.

The sensor device may be a position sensor device, embodiments of the present invention not necessarily limited thereto. The sensor device may be an angular position sensor device.

The sensor device 1 comprises a sensor unit 2 (e.g. comprising one or more magnetic sensitive elements) for generating a signal S indicative of a physical quantity (e.g. a magnetic field component). For example, the sensor unit 2 may be adapted for providing the signal, e.g. in digital or analog form. The sensor unit 2 may be adapted for providing a plurality of signals $S_1, \ldots, S_n$ indicative of the same or different physical quantities. For example, the sensor unit may comprise a plurality of sensor elements arranged to produce sense signals each being a function of an input quantity, such as a phase (θi) representative of a position to be measured or another value, such as an amplitude of a magnetic field (e.g. induced by a current). For example, the sensor unit may be an angular position sensor unit that comprises a plurality of horizontal or vertical Hall elements for providing the signals $S_1, \ldots, S_n$ in which the plurality of signals are (jointly) indicative of an angle.

The plurality of sensor elements may be configured to measure at least two non-parallel magnetic field components. For example, the plurality of sensor elements may comprise at least two, e.g. at least three, e.g. at least four, e.g. at least six induction coils. For example, the plurality of sensor elements may comprise at least two, e.g. at least three, e.g. at least four, e.g. at least six horizontal or vertical or circular Hall elements. For example, the plurality of sensor elements may comprise at least two, e.g. at least three, e.g. at least four, e.g. at least six magnetoresistance sensor elements.

The sensor element (or plurality of sensor elements) may be configured to measure a magnetic field magnitude indicative of a current. Embodiments of the present invention may relate equally to, for example, a position sensor and/or a current sensor.

Figure 4:
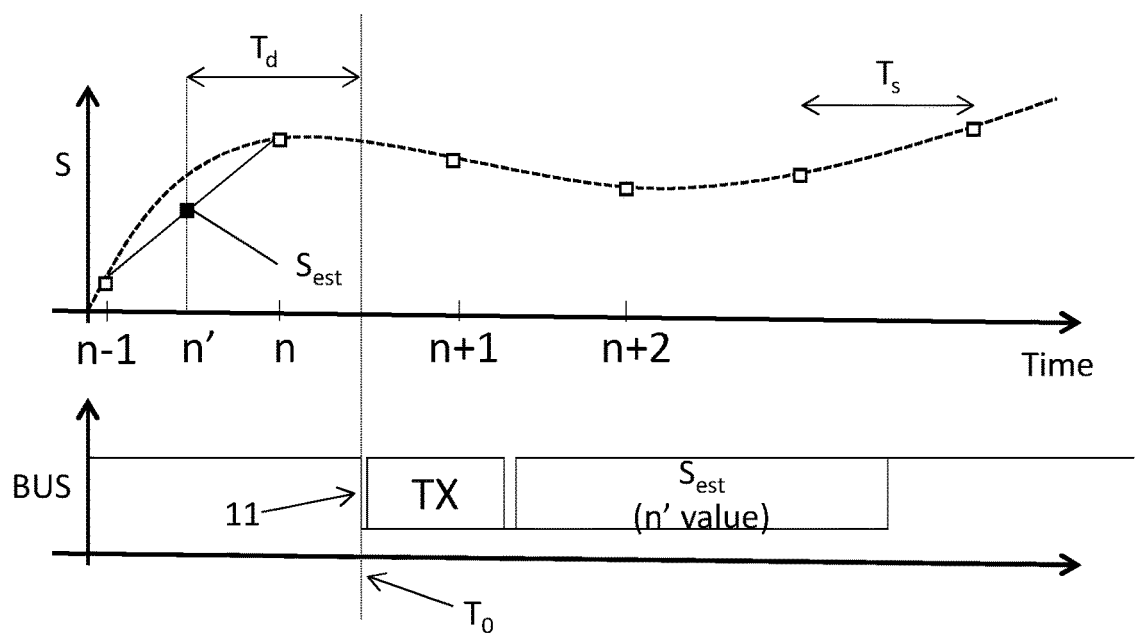
FIG. 4 shows an exemplary timing diagram illustrating operation of a sensor device in accordance with embodiments of the present invention.

Referring to FIG. 4, an exemplary timing diagram illustrating operation of a sensor device in accordance with embodiments of the present invention is shown.

The sensor unit 2 may be adapted for sampling the physical quantity, or another physical quantity that is indicative of the physical quantity, at a predetermined sampling frequency $f_s$, (e.g. using an independent clock signal based on a local crystal oscillator), e.g. such that the signal S is generated repeatedly, forming a sequence . . . , n−1, n, n+1, n+2, . . . , at regularly spaced points in time, e.g. corresponding to a sampling period $T_s=1/f_s$. For example, the sensor unit may sample signals from a plurality of Hall elements at the predetermined sampling frequency.

The sensor device 1 comprises a processing unit 3 for receiving the signal S. The processing unit 3 comprises a storage memory 4 for storing data derived from the signal S as provided by the sensor unit at at least two points in time. The storage memory may for example be RAM (random access memory) embedded in a processor.

For example, in a device in accordance with embodiments of the present invention, the storage memory may store at least a last sample n and a next to last (i.e. a last but one, a penultimate) sample n−1 of the signal S.

The sensor device 1 further comprises a bus interface 6 for communicating with an external processor, e.g. an Electronic Control Unit (ECU) via a digital communication bus 7. For example, the digital communication bus may be a serial bus, such as an UART-based communication bus. For example, the digital communication bus may be a CAN bus or a CAN-FD bus.

The bus interface 6 is adapted for receiving a read command from the electronic control unit and for sending, in response to the read command, an estimate $S_{est}$ of the physical quantity to the electronic control unit.

For example, referring to FIG. 4, in an advantageously simple embodiment, the ECU may send the read command simply by a state transition 11 of the bus (i.e. a one-to-zero or zero-to-one edge).

The read command may be a broadcast read command, e.g. a read command which simultaneously targets a plurality of sensor devices connected to the bus.

The processing unit 3 further comprises an estimator 5 for calculating the estimate of the physical quantity at a reference point in time, which is typically different from any of the at least two points in time (except for possibly rare random alignments), based on the data stored in the storage memory 4.

Referring again to FIG. 4, the estimate $S_{est}$ may be calculated by an interpolation of the data stored in the storage memory to the reference point in time n', e.g. an interpolation of the signal $S_{n-1}$, $S_n$ for the at least two points in time. Such interpolation may be a linear interpolation, a quadratic interpolation, a sine interpolation, or other interpolation technique known in the art. Alternatively, the estimate $S_{est}$ may be calculated by an extrapolation of the data stored in the storage memory to the reference point in time n'.

It shall be understood that the sampling frequency ($f_s=1/T_s$) may be an important parameter, since it will affect the uncertainty caused by the interpolation between measurements, e.g. the error between an actual value and the interpolated value. By storing more than two previous samples and applying a higher-order interpolation method such uncertainty may be reduced. Alternatively, or additionally, this uncertainty can also be reduced by applying a higher sampling rate. In the case of higher-order interpolation methods, it may also be advantageous to select the predetermined offset such that $T_d>n*T_s$, where n refers to the interpolation order or to the interpolation order minus one, to have more than one sensor readout value available after the interpolation point. However, this may imply a trade-off with the overall latency and delay of the system.

The processing unit 3 may for example comprise a timestamp generator and/or a counter, e.g. a counter counting upon receiving a clock signal, to determine a lapsed time between, for example, the acquisition of a most recent sample of the signal S and a time at which the read command is received.

For example, such counter may be configured to reset when a new sample of the signal S is acquired. The counter may count at a counter frequency $f_c = a \cdot f_s$, where a is the ratio of the counter frequency over the sampling frequency. The value of "a" may be an integer value, for example a=2, or a=4, or a=8, but the present invention is not limited hereto, and other values may also be used.

The estimator may be adapted for calculating an interpolated value at each counter update, e.g. updating a stored value that is made available to be supplied as the estimate when the read command is received.

At each update, when the counter reaches a value c, the interpolated value that is calculated and stored corresponds to a time slot $c \cdot f + (T_d - T_s) \cdot f_c$. Thus, only a single value needs to be stored and frequently updated ($f_c$), thus reducing a memory requirement, yet this value is readily available without further computational burden upon receiving the read command.

The interpolated value may be a linear interpolation between the most recent sample $S_n$ and the next-to-last sample $S_{n-1}$. In case of such linear interpolation, the updated estimate generated at count value c may be calculated based on the count value c, the predetermined offset $T_d$, the sampling period $T_s$, for example by:

$$S_{n-1} + (S_n - S_{n-1}) \cdot (c/a - (T_d - T_s) \cdot f_c).$$

It shall be clear to the skilled person that such a timestamp generator and/or counter may provide the relevant timing information to be used by the estimator 5 for calculating the estimate.

The estimator 5 may be adapted for calculating the estimate upon receiving a request from the bus interface 6, e.g. when the read command has been received. For example, referring to FIG. 4, upon receiving the read command, the estimator 5 may calculate the value n', in this example by interpolating the sampled values n−1 and n.

Figure 5:
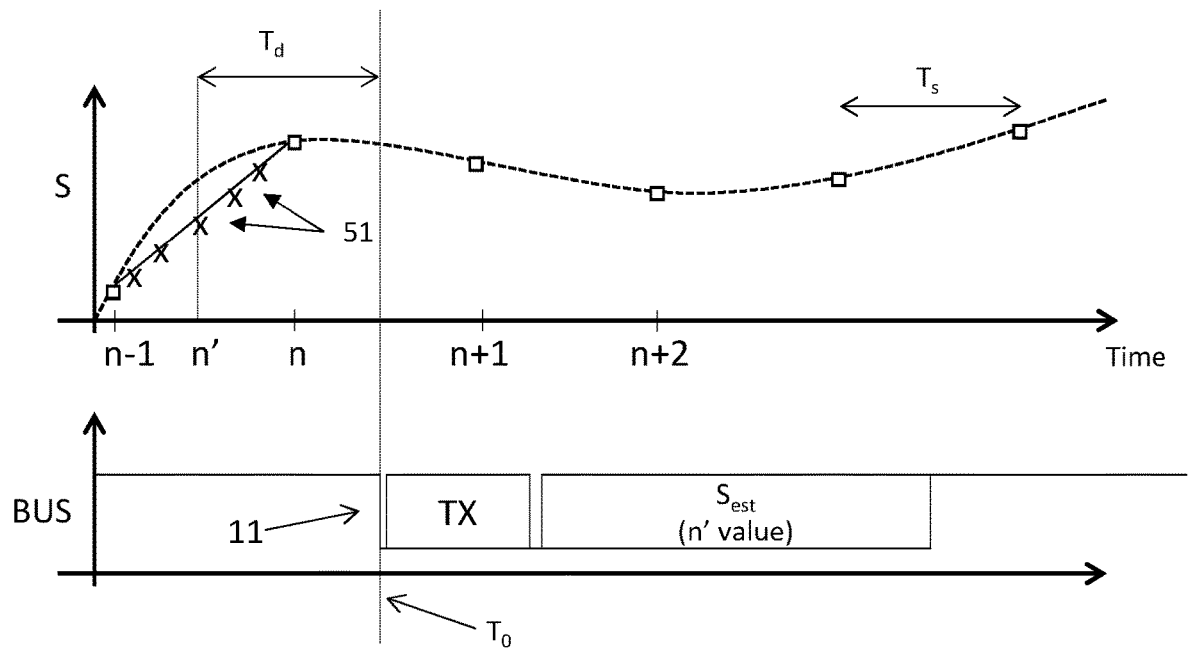
FIG. 5 shows another exemplary timing diagram illustrating operation of a sensor device in accordance with embodiments of the present invention.

However, in other embodiments of the present invention, the estimator 5 may continuously or at least frequently update the estimate and making the current estimate available to the bus interface 6 for use when receiving the read command. It is an advantage that this may further reduce the latency of the process, e.g. by ensuring that a value is readily available when the read command is received. For example, referring to FIG. 5, a plurality of values 51 may be precalculated, e.g. by interpolating between the sampled values n−1 and n, such that the appropriate value n' that corresponds to the reference point in time can be selected upon receiving the read command.

The reference point in time differs from the point in time $T_0$ at which the read command is received by a predetermined offset $T_d$, e.g. such that the estimates sent via the bus are always representative of a fixed point in time relative to the read request sent by the ECU. For example, the predetermined offset $T_d$ may be a predetermined delay such that the reference point in time may lie in the past by a predetermined time interval. In other words, the estimate may correspond to an estimate of the physical quantity at a predetermined time $T_0 - T_d$ before receiving the read command. As mentioned above, for certain applications it is less important that the value of $T_0 - T_d$ is close to zero (zero latency is not required), but it may be more important that the sensor devices provide consistent data "as if they were taken" at approximately the same moment in time ("minimum jitter").

In a sensor device in accordance with embodiments of the present invention, the predetermined offset $T_d$ may be greater than or equal to the sampling period $T_s$. It is an advantage of such embodiments that the reference point in time will always lie between two points in time for which sampled values were acquired in the past. In other words, in such case, the estimate may always be based on interpolation, i.e. without requiring an extrapolation. Interpolation may be more robust as it does not suffer from overshoot or undershoot.

In some embodiments, the predetermined offset $T_d$ may be larger than twice the sampling period $T_s$.

However, embodiments of the present invention are not limited thereto. For example, the predetermined offset may be substantially zero, such that the estimate corresponds to a current estimate of the physical quantity at the time of receiving the read command, or the predetermined offset may lie in the future, e.g. such that a prediction (or extrapolation) of the physical quantity in the future is provided.

Referring again to FIG. 4, to overcome the uncertainty caused by the anachronism between an internal readout frequency (i.e. the sampling frequency $f_s$) of the sensor unit and the unpredictable timing of the read command, e.g. a detection start bit 11, an estimation, such as an interpolation or extrapolation from the measurements, can be performed that corresponds to a reference point in time $T_0 - Td$ to ensure a substantially constant and substantially predetermined delay.

Figure 6:
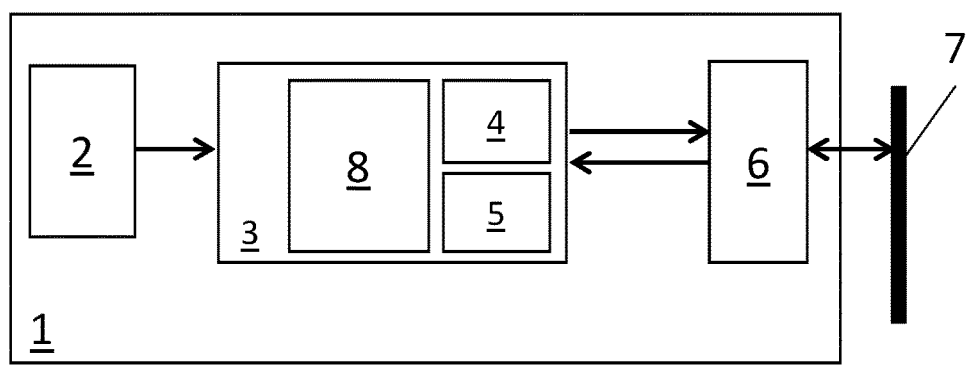
FIG. 6 illustrates another device in accordance with embodiments of the present invention.

Referring to FIG. 6, in a device in accordance with embodiments of the present invention, the processing unit 3 may comprise a phase-tracking loop unit 8, and/or a phase locked loop unit, for following the physical quantity based on the at least one signal S. For example, the storage memory 4 may store at least one parameter of the phase-tracking loop and/or of the phase locked loop. This at least one parameter may be updated regularly (or continuously) to adapt the tracking loop to changes in the signal S. Furthermore, the estimator 5 may be adapted for calculating the estimate based on an output of the phase-tracking loop unit and/or the phase locked loop unit, e.g. an output representative of the followed physical quantity. The phase-tracking loop unit 8 may comprise an upsampling filter. The phase-tracking loop 8 may comprise a sigma-delta modulator.

The sensor device may be an angular position sensor device, and the sensor unit 2 may comprise a plurality of sensor elements arranged to produce a plurality of signals $S_1, \ldots, S_n$ each being a function of an input quantity, e.g. an input phase (e.g. representative of a position to be measured) or an input amplitude.

The phase-tracking loop unit 8 may be adapted for generating an error signal by combining the plurality of signals according to an array of weight factors stored in the storage memory, e.g. the at least one parameter stored in the storage memory may comprise the weight factors. The phase-tracking loop unit 8 may be adapted for filtering the error signal to generate an output quantity, e.g. an output phase value representative of the position to be measured or output amplitude, as the output of the phase-tracking loop. The phase-tracking loop unit 8 may also be adapted for adjusting the array of weight factors based on the output quantity.

For example, the European patent application No. EP 18153346.4, entitled "POSITION SENSING DEVICE" and filed on 25 Jan. 2018, the contents of which are hereby incorporated by reference, discloses a position sensing device for measuring a position. The sensor device in accordance with embodiments of the present invention may comprise such position sensing device in accordance with embodiments disclosed in EP 18153346.4. A more detailed overview of such position sensing device can be found in the patent application EP 18153346.

Figure 7:
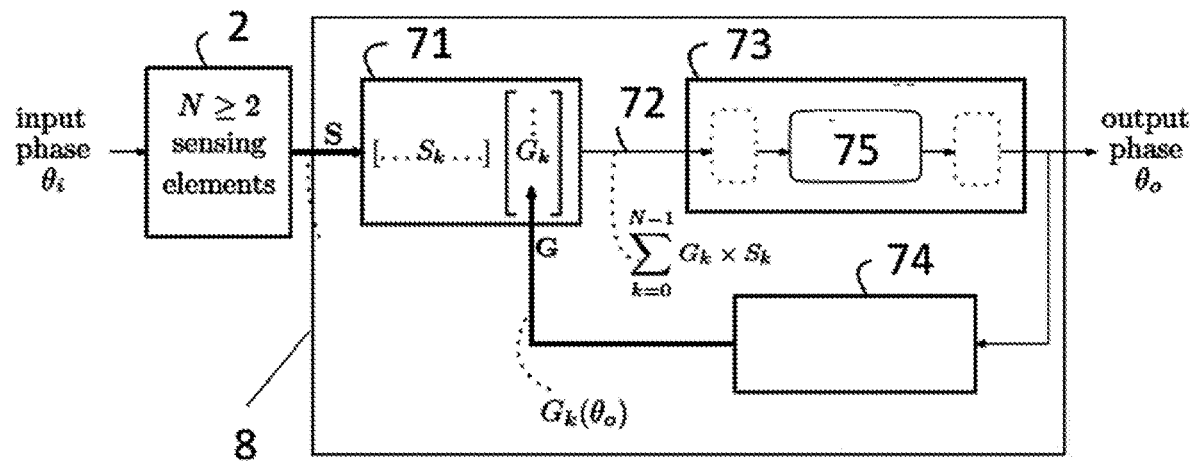
FIG. 7 illustrates a phase-tracking loop unit in a device in accordance with embodiments of the present invention.

Referring to FIG. 7, a sensor device in accordance with embodiments of the present invention, and also in accordance with embodiments of EP 18153346.4, may comprise a plurality of sensors 2 arranged to produce sense signals ($S_1, \ldots, S_k, \ldots, S_n$) each being a function of a physical quantity, the physical quantity being an input phase θi representative of a position to be measured. While this exemplary embodiment is explained for a input phase representative of a position to be measured and a corresponding output phase, it shall be clear to the skilled person that embodiments of the present invention may relate to a different input quantity and corresponding output quantity, such as, but not limited to, relating to a magnetic field amplitude indicative of a current.

The sensor device, e.g. in the phase-tracking loop unit 8, may comprise a combiner circuit 71 arranged to generate an error signal 72 by combining the sense signals according to an array of weight factors, e.g. forming (or comprised in) the at least one parameter of the phase-tracking loop unit 8 stored in the storage memory. The sensor device, e.g. in the phase-tracking loop unit 8, may comprise a processing block 73 arranged for filtering the error signal and for outputting a phase value θo representative of the position. The sensor device, e.g. in the phase-tracking loop unit 8, may comprise a feedback loop comprising a feedback signal unit 74 arranged for receiving the output phase value and for adjusting, based on the received output phase value, the array of weight factors.

In this exemplary embodiment, the generalized position to be measured, represented by the input phase θi, affects the output of at least two sensors 2. The resulting sense signals are fed to the combiner circuit, where the signals $S_k$ are each multiplied with their corresponding weight factor Gk. The resulting weighted sum signal 72 next goes to the processing block 73, where it may be filtered in a loop filter 75 and where an estimate of the output phase θo may be obtained. The signal produced by the combiner circuit is a signal representative of the error between the input phase θi and the estimated output phase θo. The output phase θo may be fed to a feedback signal unit 74 where a phase-to-weight conversion is performed, and updated weight factors are determined for use in the next iteration. The processing block may process a combination of the various sense signals at the same time, i.e. in a parallel fashion. This processing in parallel may allow for a low position/angle error when the input position/angle changes with high (angular) speed. An error estimate may be obtained during each readout timeslot, thus, for the same readout speed, faster than when adopting a sequential approach. As the sensor signals are combined in the combiner circuit, the different noise contributions of sensors are averaged out, leading to an output with better signal-to-noise (SNR) compared to the SNR of an individual sensing element signals. In other words, the parallel readout of the sensors allows averaging the noise at each time instant. The readout of a sensing element may also comprise averaging and/or combining the outcomes of measurements over different phases, such as is for instance the case when applying spinning current averaging in Hall readout. Such combining/averaging may take place within each time-slot. Each sense signal may then correspond to an averaged/combined value of readouts on a same sensing element. Also, in this case, the same conclusion holds that a parallel processing of the thus obtained sense signals allows for better SNR and/or faster error estimates compared to a sequential processing. Furthermore, it is particularly advantageous that an estimate of the physical quantity, e.g. an angle, can be determined based on the output phase θo (or the estimate may be the output phase). The output phase may be updated at a particularly high frequency, e.g. at least 1 kHz, preferably at least 100 kHz, e.g. 1 MHz, or even higher, e.g. in the range of 500 kHz to 10 MHz. Therefore, the estimate may follow the physical quantity at a very high temporal resolution, e.g. such that it is always substantially representative of the reference point in time.

Figure 8:
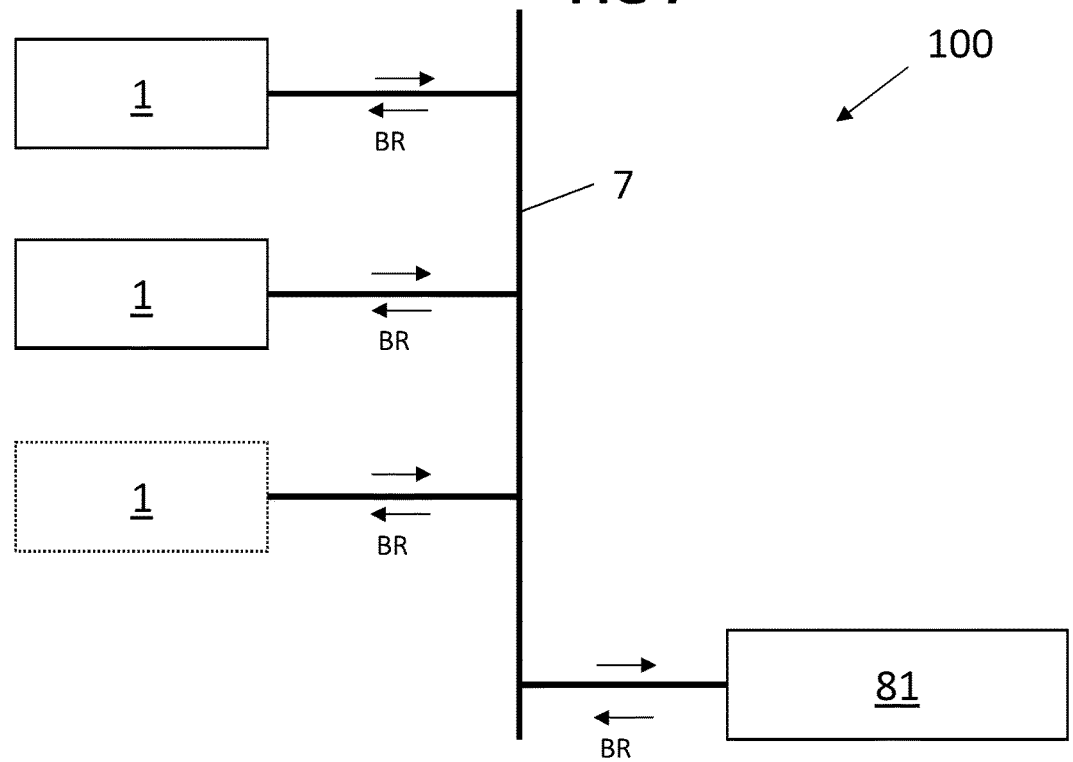
FIG. 8 illustrates a system in accordance with embodiments of the present invention.

Referring to FIG. 8, in a second aspect, the present invention relates to a system 100 comprising a sensor bus 7, a plurality of sensor devices 1 in accordance with embodiments of the first aspect of the present invention connected to the sensor bus and an electronic control unit 81 connected to the sensor bus and configured to generate a broadcast read command BR that simultaneously targets the plurality of sensor devices. The system may be used in an automotive environment.

Figure 9:
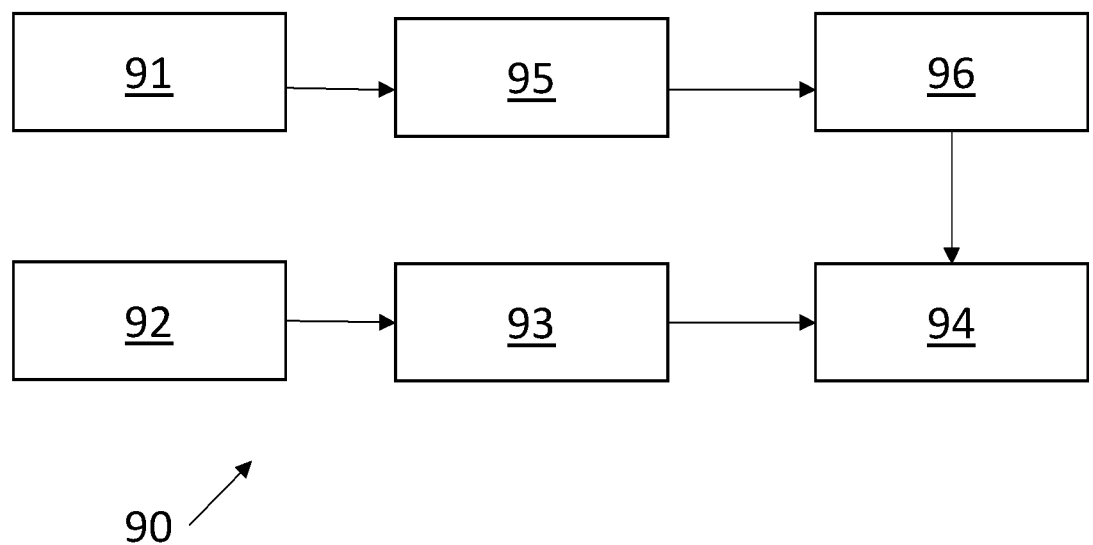
FIG. 9 illustrates a method in accordance with embodiments of the present invention.

Referring to FIG. 9, in a third aspect, the present invention relates to a method 90 for communicating sensor data via a digital communication bus. The method comprises, in each of a plurality of sensor devices connected to the bus, generating 91 a signal indicative of a physical quantity and storing 95 data derived from the signal as obtained at at least two different points in time. The method comprises sending 92 a broadcast read command from an electronic control unit to a plurality of sensor devices via the bus. The method comprises, in each of the plurality of sensor devices connected to the bus, receiving 93 the broadcast read command at a point in time, uncorrelated with the at least two points in time, and sending 94, in response to the read command, an estimate of the physical quantity to the electronic control unit. The estimate is calculated 96 at a reference point in time based on the stored data. The reference point in time differs from the point in time at which the read command is received by substantially a predetermined offset.

In a method in accordance with embodiments of the present invention, calculating the estimate may comprise executing a phase-tracking loop for tracking the physical quantity and calculating the estimate based on an output of the phase-tracking loop.

Further details of a method in accordance with embodiments of the present invention, e.g. essential or optional features of such method, shall be clear based on a straightforward correspondence with functions of a sensor device in accordance with embodiments of the first aspect of the present invention, e.g. as described in detail hereinabove.

The invention claimed is:

1. A sensor device comprising:
    a sensor unit for generating a signal indicative of a physical quantity;
    a processing unit for receiving the signal, the processing unit comprising a storage memory for storing data derived from the signal as provided by the sensor unit at at least two different points in time; and
    a bus interface for communicating with an electronic control unit via a digital communication bus, wherein said bus interface is adapted for receiving a read command from the electronic control unit at a point in time uncorrelated with said at least two different points in time, and for sending via said digital communication bus, in response to the read command, an estimate of the physical quantity to the electronic control unit,
    wherein said processing unit further comprises an estimator for calculating said estimate of the physical quantity at a reference point in time based on the data stored in the storage memory, wherein said reference point in time is defined based on said point in time at which the read command is received and differs from said point in time at which the read command is received by substantially a predetermined offset.

2. The sensor device of claim 1, wherein said read command is a broadcast read command which simultaneously targets a plurality of sensor devices connected to said bus.

3. The sensor device of claim 1, wherein the bus interface is adapted for providing a request signal to the estimator when said read command is received; and wherein said estimator is adapted for calculating said estimate upon receipt of said request signal.

4. The sensor device of claim 1, wherein said estimator is adapted for repeatedly updating said estimate and making the updated estimate available to said bus interface for use when receiving the read command.

5. The sensor device of claim 4, wherein the estimator is adapted for calculating said estimate at an interpolation frequency, which interpolation frequency is independent and asynchronous from the read command.

6. The sensor device of claim 1, wherein said storage memory is adapted for storing at least a last sample and a next to last sample of the signal, and wherein said estimator is adapted for calculating the estimate by an interpolation or extrapolation of said data stored in the storage memory to said reference point in time.

7. The sensor device of claim 6, wherein said estimator is adapted for calculating the estimate by an estimation method based on a linear interpolation, a quadratic interpolation, a moving average and/or an exponential moving average.

8. The sensor device of claim 1, wherein said estimator comprises a phase-tracking loop unit and/or a phase locked loop unit for tracking said physical quantity, wherein said storage memory is adapted for storing at least one parameter of said phase-tracking loop unit and/or of the phase locked loop unit, and wherein said estimator is adapted for calculating said estimate based on an output of said phase-tracking loop unit and/or said phase locked loop unit.

9. The sensor device of claim 8, wherein said sensor device is an angular position sensor device, and wherein said sensor unit comprises a plurality of sensor elements arranged to produce a plurality of signals each being a function of an input quantity representative of a position or current to be measured.

10. The sensor device of claim 1, wherein said sensor unit comprises one or more sensor elements configured for measuring a magnetic field; and/or wherein said sensor unit comprises one or more sensor elements configured for measuring an electrical current.

11. The sensor device of claim 9, wherein said phase-tracking loop unit is adapted for generating an error signal by combining the plurality of signals according to an array of weight factors stored in said storage memory, for filtering the error signal to generate an output quantity value representative of said position or current to be measured as said output of said phase-tracking loop unit and for adjusting said array of weight factors based on said output quantity value.

12. The sensor device of claim 1, wherein said sensor unit is adapted for sampling said physical quantity or another physical quantity that is indicative of the physical quantity at a predetermined sampling frequency.

13. The sensor device of claim 12, wherein the sampling frequency and occurrences of the read command are independent and/or asynchronous.

14. The sensor device of claim 1, wherein said sensor unit comprises a plurality of sensor elements arranged to produce a plurality of signals each being a function of an input quantity representative of a position or current to be measured, and wherein said estimator implements a phase-tracking loop and/or a phase-locked loop for tracking said physical quantity and is adapted for generating an error signal by combining the plurality of signals with an array of weight factors.

15. The sensor device of claim 1, wherein said sensor unit is adapted for providing a plurality of signals indicative of a single physical quantity.

16. A system comprising:

a sensor bus, a plurality of sensor devices according to claim 1, connected to said sensor bus;

an electronic control unit connected to said sensor bus and configured to generate a broadcast read command that simultaneously targets said plurality of sensor devices;

wherein each of the plurality of sensor devices comprises an estimator adapted for calculating said estimate at an interpolation frequency, which interpolation frequency is independent and asynchronous from the read command, and which interpolation frequency is at least a factor 2.0 or at least a factor 5.0 higher than an average frequency of the read command.

17. The system of claim 16, for use in an automotive environment, wherein the digital bus is a CAN bus or an CAN FD bus.

18. A method for communicating sensor data via a digital communication bus, the method comprising:

in each of a plurality of sensor devices connected to said bus, generating a signal indicative of a physical quantity and storing data derived from said signal as obtained at at least two different points in time;

sending a broadcast read command from an electronic control unit to a plurality of sensor devices via said bus;

in each of said plurality of sensor devices connected to said bus, receiving said broadcast read command at a point in time uncorrelated with said at least two different points in time and sending, in response to the read command, an estimate of the physical quantity to the electronic control unit, in which said estimate is calculated at a reference point in time based on the stored data, and wherein said reference point in time is defined based on said point in time at which the read command is received and differs from said point in time at which the read command is received by substantially a predetermined offset.

19. The method of claim 18, wherein calculating said estimate comprises executing a phase-tracking loop for tracking said physical quantity and calculating said estimate based on an output of said phase-tracking loop.

* * * * *